(12) United States Patent
Choi et al.

(10) Patent No.: US 12,078,809 B2
(45) Date of Patent: Sep. 3, 2024

(54) AUGMENTED REALITY DISPLAY DEVICE

(71) Applicant: SAMSUNG ELECTRONICS CO., LTD., Suwon-si (KR)

(72) Inventors: Myongjo Choi, Suwon-si (KR); Youngmo Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/097,861

(22) Filed: Jan. 17, 2023

(65) Prior Publication Data

US 2023/0152591 A1 May 18, 2023

Related U.S. Application Data

(63) Continuation of application No. PCT/KR2021/008733, filed on Jul. 8, 2021.

(30) Foreign Application Priority Data

Jul. 17, 2020 (KR) .......................... 10-2020-0089160

(51) Int. Cl.
*G02B 27/01* (2006.01)
*F21V 8/00* (2006.01)
(Continued)

(52) U.S. Cl.
CPC ......... *G02B 27/0172* (2013.01); *G02B 6/003* (2013.01); *G02B 27/0977* (2013.01);
(Continued)

(58) Field of Classification Search
CPC ............ G02B 27/0172; G02B 27/0977; G02B 2027/014; G02B 2027/0178; G06F 3/011
See application file for complete search history.

(56) References Cited

U.S. PATENT DOCUMENTS

| 5,633,755 A | 5/1997 | Manabe et al. |
|---|---|---|
| 6,188,529 B1 | 2/2001 | Koyama et al. |
| (Continued) | | |

FOREIGN PATENT DOCUMENTS

| JP | 8-201755 A | 8/1996 |
|---|---|---|
| JP | 8-251520 A | 9/1996 |
| (Continued) | | |

OTHER PUBLICATIONS

International Search Report (PCT/ISA/210) and Written Opinion (PCT/ISA237) dated Oct. 19, 2021, issued by the International Searching Authority in International Application No. PCT/KR2021/008733.

*Primary Examiner* — Ariel A Balaoing
(74) *Attorney, Agent, or Firm* — Sughrue Mion, PLLC

(57) ABSTRACT

An augmented reality (AR) display device includes a display engine configured to project light of an image, and a waveguide configured to receive and output the projected light. The display engine includes a light source unit, a reflective display panel, and a projection optical system. The projection optical system includes an iris and a projection lens group arranged between the iris and the reflective display panel. The light source unit includes a light source or a light exit end positioned near the iris in a position deviating from an optical axis of the projection optical system, such that an incident angle range of light incident to the display panel does not overlap with a reflection angle range of light reflected from the display panel. The iris includes an effective opening through which light reflected from the display panel passes.

17 Claims, 20 Drawing Sheets

(51) Int. Cl.
 *G02B 27/09* (2006.01)
 *G06F 3/01* (2006.01)
(52) U.S. Cl.
 CPC ........ *G06F 3/011* (2013.01); *G02B 2027/014* (2013.01); *G02B 2027/0178* (2013.01)

(56) References Cited

U.S. PATENT DOCUMENTS

| | | |
|---|---|---|
| 7,854,521 B2 | 12/2010 | Takahashi |
| 8,284,493 B2 | 10/2012 | Lee et al. |
| 8,873,149 B2 | 10/2014 | Bohn et al. |
| 9,851,629 B2 | 12/2017 | Seo et al. |
| 10,409,066 B2 | 9/2019 | Shih et al. |
| 10,422,997 B2 | 9/2019 | Hung et al. |
| 10,566,021 B2 | 2/2020 | Noguchi |
| 2001/0033401 A1* | 10/2001 | Kasai ................ G02B 27/0081 359/34 |
| 2007/0153237 A1 | 7/2007 | Takahashi |
| 2012/0200936 A1* | 8/2012 | Takagi ............... G02B 27/0172 359/630 |
| 2019/0179149 A1 | 6/2019 | Curtis et al. |
| 2019/0187547 A1 | 6/2019 | Shih et al. |
| 2019/0227319 A1* | 7/2019 | Trail .................... G09G 3/002 |
| 2020/0049999 A1 | 2/2020 | Takeda et al. |
| 2023/0341689 A1* | 10/2023 | Bhakta ............... G02B 27/0093 |

FOREIGN PATENT DOCUMENTS

| | | |
|---|---|---|
| JP | 2018-054978 A | 4/2018 |
| JP | 2018-087949 A | 6/2018 |
| KR | 10-1016018 B1 | 2/2011 |
| KR | 10-2011-0091360 A | 8/2011 |
| KR | 10-2015-0114977 A | 10/2015 |
| KR | 10-2018-0085692 A | 7/2018 |
| KR | 10-2018-0125879 A | 11/2018 |

* cited by examiner

AUGMENTED REALITY DISPLAY DEVICE

CROSS-REFERENCE TO RELATED APPLICATIONS

This application is a bypass continuation application of International Patent Application PCT/KR2021/008733, filed on Jul. 8, 2021, which is based on and claims priority to Korean Patent Application No. 10-2020-0089160, filed on Jul. 17, 2020 in the Korean Intellectual Property Office, the disclosures of each of which are incorporated by reference herein in their entireties.

BACKGROUND

1. Field

The disclosure relates to an augmented reality (AR) display device that displays augmented reality, and more particularly to an AR display device with a miniaturized display engine.

2. Description of Related Art

An augmented reality (AR) display device is a display device that enables a user to see AR, and may include, for example, AR glasses. An image optical system of the AR display device includes a display engine (a projector, etc.) that outputs an image, and a waveguide that transmits the output image to the eyes of a user. An image emitted from the display engine is transmitted to the eyes through the waveguide, allowing the user to see the image.

A wearable display device is a device that enables a user wearing the wearable display device to see a displayed screen. As such, wearable display devices are actively being studied, and various forms of wearable devices are currently or are expected to be released on the market. For example, a glasses-type display device (e.g., wearable glasses) or a head-mounted display device are examples of wearable display devices currently released or expected to be released on the market. To use the AR display device as a wearable display device, light weight and thinness are required for convenience of a user, and to this end, miniaturization of a high-resolution display engine is important.

SUMMARY

According to an embodiment of the disclosure, an augmented reality (AR) display device includes a display engine configured to project light of an image, a waveguide configured to receive and output light projected from the display engine, and a body on which the display engine and the waveguide are installed, in which the display engine includes a light source unit, a reflective display panel, and a projection optical system, the projection optical system includes an iris and a first projection lens group arranged between the iris and the display panel, the light source unit includes at least one of a light source and a light exit end positioned near the iris in a position deviating from an optical axis of the projection optical system such that an incident angle range of light incident to the display panel does not overlap with a reflection angle range of light reflected from the display panel, and the iris includes an effective opening through which light reflected from the reflective display panel passes.

In embodiments of the disclosure, the light source unit may include a plurality of light-emitting elements of different monochromatic colors, and the plurality of light-emitting elements may be arranged substantially adjacent to each other.

In embodiments of the disclosure, the light source unit may include a plurality of light-emitting elements arranged respectively at a plurality of positions spaced apart from one another. In embodiments of the disclosure, the plurality of light-emitting elements arranged spaced apart from one another may have different monochromatic colors. Alternatively, the plurality of light-emitting elements arranged spaced apart from one another may have a same monochromatic color. In embodiments of the disclosure, the plurality of light-emitting elements may be arranged at substantially regular spacing with respect to the optical axis of the projection optical system.

In embodiments of the disclosure, the effective opening may include a plurality of effective openings interspersed among the plurality of light-emitting elements.

In embodiments of the disclosure, the effective opening may include a plurality of effective openings corresponding to a plurality of light-emitting elements arranged spaced apart from one another.

In embodiments of the disclosure, a distance between a center of the effective opening and a center of the iris may be equal to a distance between the light source or the light exit end and the center of the iris.

In embodiments of the disclosure, the light source unit may include the light source and a light guide configured to guide the light emitted from the light source, and the light exit end may be an exit end of the light guide.

In embodiments of the disclosure, the light source unit may include the light source and a light pipe configured to transmit the light emitted from the light source, and the light exit end may be an exit end of the light pipe.

In embodiments of the disclosure, the light source may be a light-emitting diode (LED) or a laser diode (LD).

In embodiments of the disclosure, the first projection lens group may be configured to function as an illuminating optical system configured to uniformly illuminate the display panel with the light emitted from the light source unit.

In embodiments of the disclosure, the projection optical system may further include a second projection lens group arranged at a front end of the iris.

In embodiments of the disclosure, the projection optical system may further include a reflection member arranged at the front end of the iris to change a path of the light projected from the display engine.

In embodiments of the disclosure, the reflective display panel may be a liquid crystal on silicon (LCoS) panel.

In embodiments of the disclosure, at least a region of the waveguide may be formed of a transparent material to allow light of a real scene to pass therethrough.

In embodiments of the disclosure, the body may be configured to be wearable by a user.

In embodiments of the disclosure, the body may be any one of a body of a glass frame, a goggle frame, or a helmet and a body of a head mounted display (HMD).

According to the disclosure, an AR display device may innovatively reduce the volume of a display engine.

According to the disclosure, the AR display device may reduce weight and thickness thereof by reducing the volume of the display engine.

BRIEF DESCRIPTION OF THE DRAWINGS

The above and other aspects, features, and advantages of certain embodiments of the present disclosure will be more apparent from the following description taken in conjunction with the accompanying drawings, in which identical or like reference numerals in the drawings denote identical or like elements, and wherein.

DETAILED DESCRIPTION

Figure 1:
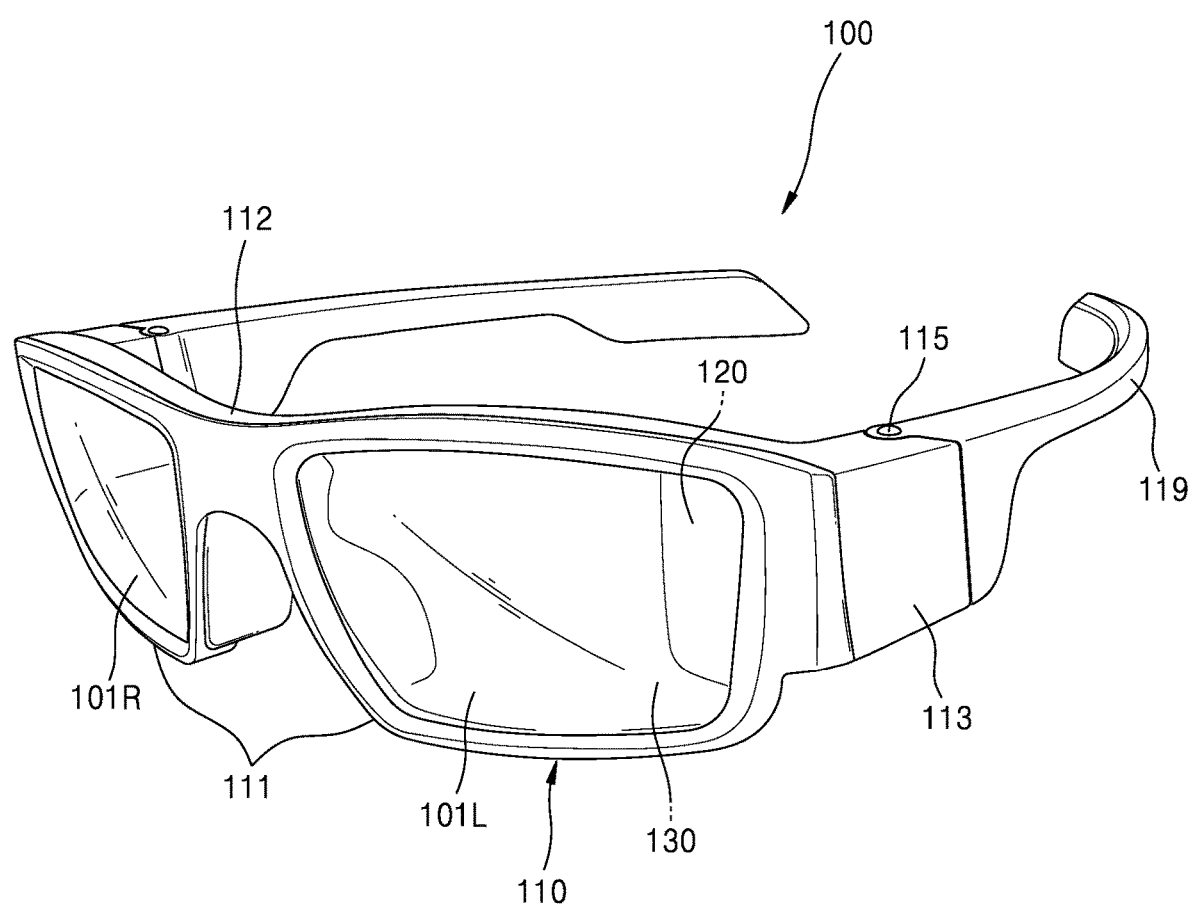
FIG. 1 illustrates the exterior of an augmented reality (AR) display device, according to an example embodiment of the disclosure.

Hereinafter, example embodiments of the disclosure will be described in detail with reference to the accompanying drawings. In the drawings, like reference numerals denote like components, and sizes of components in the drawings may be exaggerated for convenience of explanation. It is noted that embodiments of the disclosure to be described are merely examples, and various modifications may be made from such embodiments of the disclosure.

Although terms used in embodiments of the disclosure are selected with general terms popularly used at present under the consideration of functions in the disclosure, the terms may vary according to the intention of those of ordinary skill in the art, judicial precedents, or introduction of new technology. In addition, in certain cases, the applicant may voluntarily select terms, and in such cases, the meaning of the terms may be disclosed in a corresponding description part of an embodiment of the disclosure. Thus, the terms used in herein should be defined not by the simple names of the terms but by the meaning of the terms and the contents throughout the disclosure.

Singular forms include plural forms unless indicated otherwise contextually. When a portion is described as "comprising" or "including" a component, the portion does not necessarily exclude other components, but may further include other components unless stated otherwise.

In the disclosure, "augmented reality (AR)" means overlaying a virtual image generated on a computer onto a physical real-world environment or a real-world object to display one image.

In the disclosure, an "AR display device" refers to a device capable of expressing or producing AR, and may include but is not limited to AR glasses, a head-mounted display (HMD), an AR helmet, etc., worn by a user. The AR display device may be used in everyday applications such as information search, route guidance, camera photographing, etc. An AR glasses device, implementing the AR display device in the form of glasses, may be worn as a fashion item and used both in indoor and outdoor activities.

In the disclosure, a "real scene" refers to a scene of the real world an observer or the user sees through the AR display device, and may include real world object(s). In contrast, a "virtual image" is an image generated through a display engine. The virtual image may include both a static image and a dynamic image. The virtual image may be an image which is overlaid on the real scene to show information regarding a real object in the real scene or information or a control menu, etc., regarding an operation of the AR device.

Figure 2:
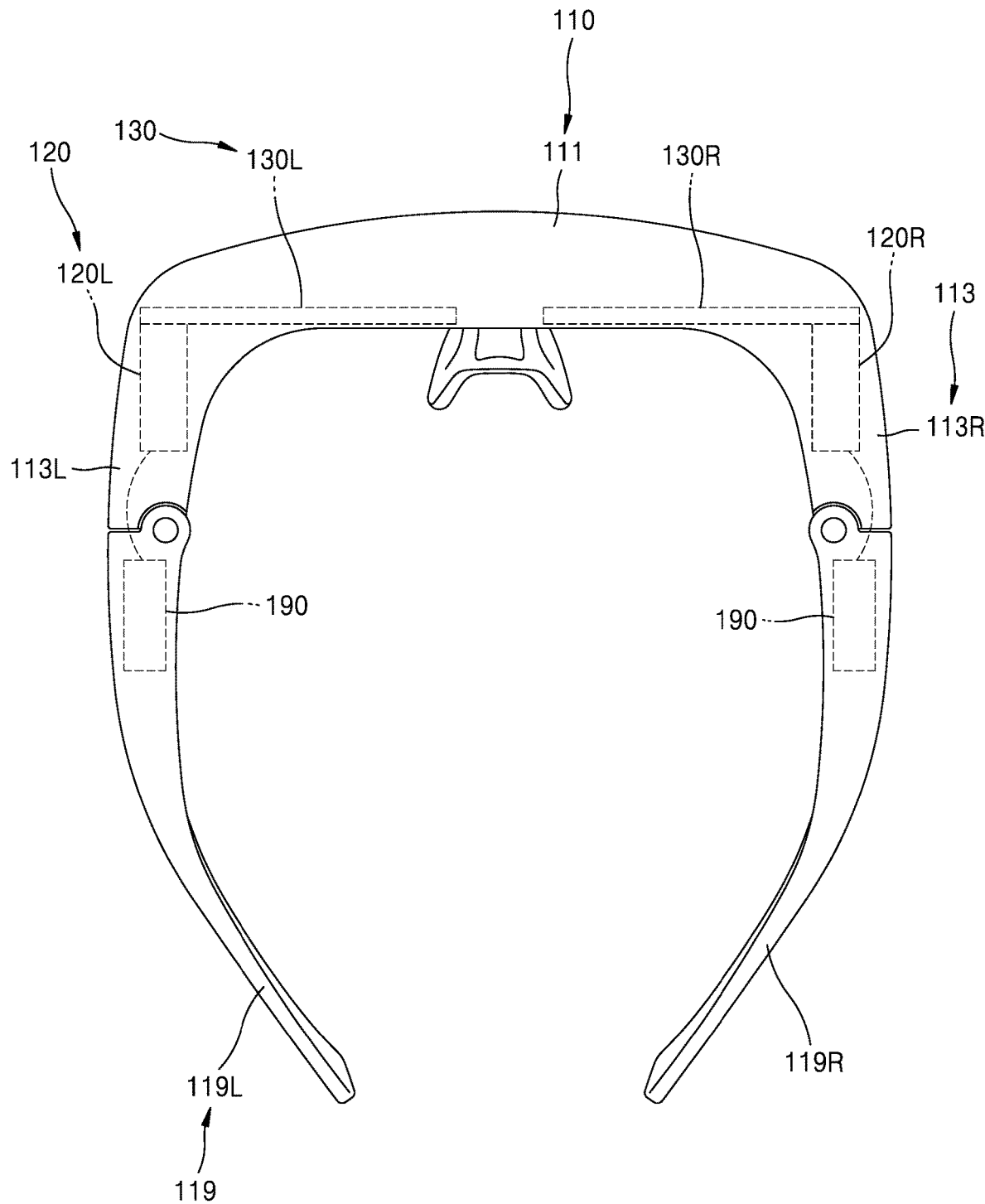
FIG. 2 is a plan view illustrating the AR display device of FIG. 1.

FIG. 1 illustrates the exterior of an AR display device 100 according to an example embodiment of the disclosure, and FIG. 2 is a plan view of the AR display device 100 of FIG. 1.

Referring to FIGS. 1 and 2, the AR display device 100 according to the illustrated embodiment of the disclosure may be a glasses-type display device configured to be worn by a user and may include a glasses-type body 110.

The glasses-type body 110 may include, for example, a frame 111 and temples 119. The frame 111 in which glass lenses 101L and 101R are positioned may have, for example, the shape of two rims connected by a bridge. The glass lenses 101L and 101R are examples, and may or may not have a refractive power (a power). The glass lenses 101L and 101R may be formed integrally, and in such case, the rims of the frame 111 may be integrated with the bridge 112. The glass lenses 101L and 101R may be omitted.

The temples 119 may be connected to respective ends 113 of the frame 111 and extend in a direction. That is, a left temple 119L may be connected to a left end 113L, and likewise a right temple 119R may be connected to a right end 113R. The ends 113 of the frame 111 may be respectively connected to the temples 119 by a hinge 115. The hinge 115 is an example, such that a known member connecting the ends 113 of the frame 111 with the temples 119. In another example, the ends 113 of the frame 111 and the temples 119 may be integrally connected.

In the glasses-type body 110, a display engine 120, a waveguide 130, and various electronic parts 190 may be arranged. The electronic parts 190 may be mounted in a part of the glasses-type body 110 or positioned distributed in a plurality of parts thereof, and may be mounted on a printed circuit board (PCB) substrate, a flexible PCB (FPCB) substrate, etc.

The display engine 120, which may also be termed an optical engine, may be configured to generate light of a virtual image, and may include a left-eye display engine 120L and a right-eye display engine 120R. The left-eye display engine 120L and the right-eye display engine 120R may be positioned in the respective ends 113 of the frame 111 or in an upper portion of the frame 111. In another example, the left-eye display engine 120L and the right-eye display engine 120R may be respectively positioned in a left temple 119L and a right temple 119R. In another example, the left-eye display engine 120L and the right-eye display engine 120R may be arranged at an upper end of the waveguide 130.

More details of the display engine 120 will be described further herein.

The waveguide 130 may be configured to redirect or otherwise retransmit light of the virtual image generated in the display engine 120, together with light of an external scene, to a pupil of the user. The waveguide 130 may include a left-eye waveguide 130L and a right-eye waveguide 130R. The left-eye waveguide 130L and the right-eye waveguide 130R may be respectively attached to the left glass lens 101L and the right glass lens 101R. Alternatively, the left-eye waveguide 130L and the right-eye waveguide 130R may be fixed on the frame 111 separately from the glass lenses 101L and 101R.

Figure 3:
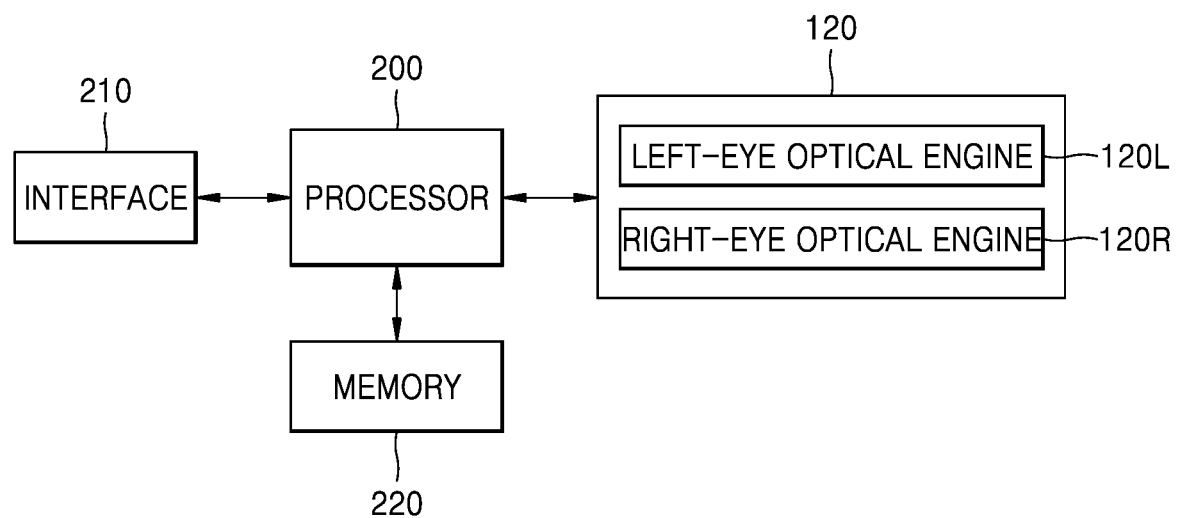
FIG. 3 is a block diagram of an AR display device, according to an example embodiment of the disclosure.

FIG. 3 is a block diagram of an AR display device 100, according to an example embodiment of the disclosure.

Referring to FIG. 3, the AR display device 100 may include the display engine 120, a processor 200, an interface 210, and a memory 220.

The processor 200 may control the overall operation of the AR display device 100 including the display engine 120 by driving an operating system or an application, and perform various data processing and operations including image data. For example, the processor 200 may process image data including a left-eye virtual image and a right-eye virtual image that are rendered to have binocular disparity. The processor 200 may include, for example, at least one hardware among a central processing unit (CPU), a microprocessor, a graphic processing unit (GPU), application specific integrated circuits (ASICs), digital signal processors (DSPs), digital signal processing devices (DSPDs), programmable logic devices (PLDs), or field programmable gate arrays (FPGAs), without being limited thereto.

Data or a manipulation command is input to or output from an outside through the interface 210 which may include a user interface, for example, a touch pad, a controller, a manipulation button, etc., which may be manipulated by the user. In an embodiment, the interface 210 may include a wired communication module, such as a universal serial bus (USB) module, and a wireless communication module, such as Bluetooth, through which manipulation information of the user or data of a virtual image, transmitted from an interface included in an external device, may be received.

The memory 220 may include an internal memory such as volatile memory or nonvolatile memory. The memory 220 may store various data, programs, or applications for driving and controlling the AR display device 100 and input/output signals or data of a virtual image, under control of the processor 200.

The display engine 120 may be configured to receive image data generated by the processor 200 and generate light of a virtual image, and may include the left-eye display engine 120L and the right-eye display engine 120R. Each of the left-eye display engine 120L and the right-eye display engine 120R may include a light source that outputs light and a display panel that forms a virtual image by using the light output from the light source, and may have a function such as a small projector. The light source may be implemented as, for example, a light-emitting diode (LED), and the display panel may be implemented as, for example, a liquid crystal on silicon (LCoS).

The display engine 120 and the waveguide 130 may be collectively termed optical parts herein. Although left-eye optical parts 120L, 130L will be described as an example below, a left-eye part and a right-eye part have structures symmetrical to each other, such that it would be understood by those of ordinary skill in the art that disclosed aspects of the left-eye optical parts 120L, 130L may be applied to right-eye optical parts 120R, 130R.

Figure 4:
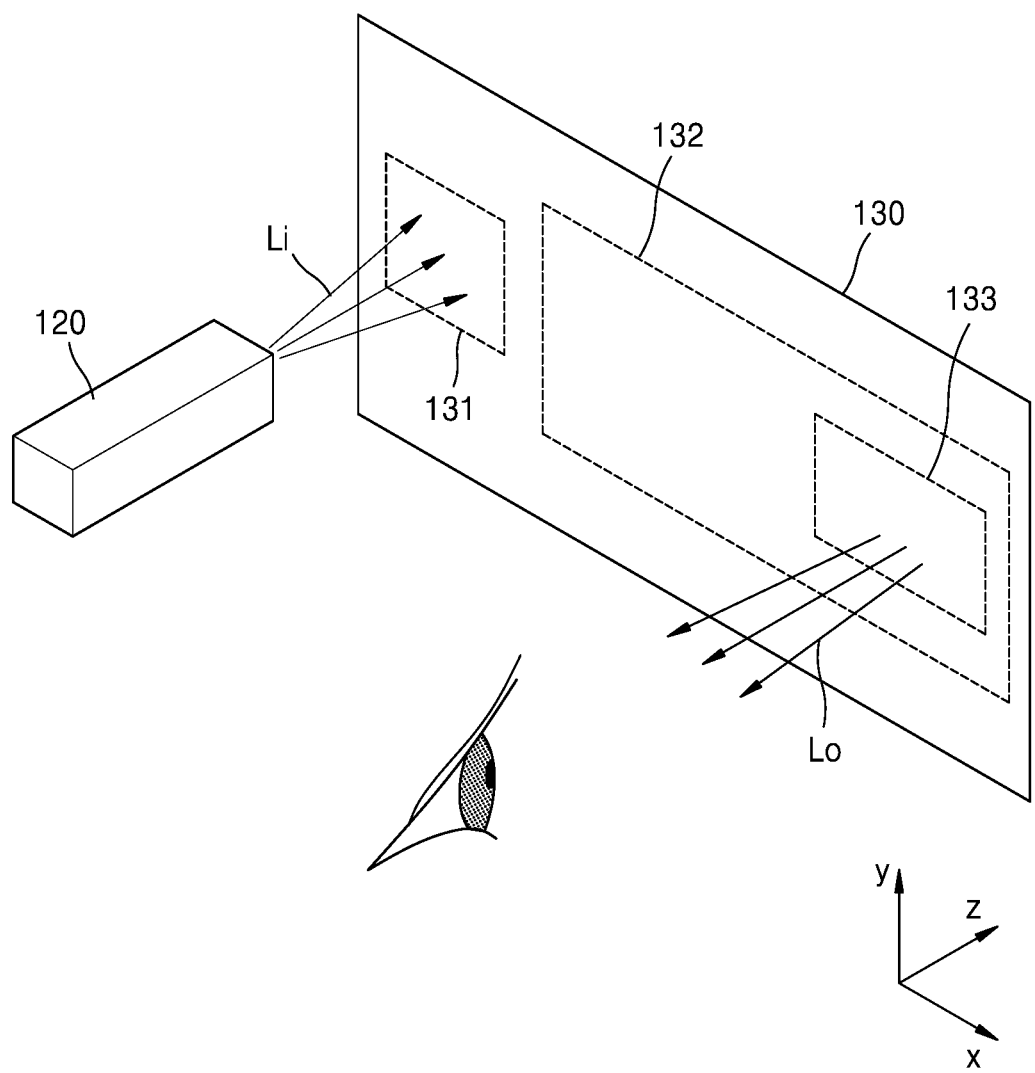
FIG. 4 illustrates an arrangement of a display engine and a waveguide, according to an example embodiment of the disclosure.

FIG. 4 illustrates an arrangement of the display engine 120 and the waveguide 130, according to an example embodiment of the disclosure. Referring to FIG. 4, the waveguide 130 may be formed as a single layer or multiple layers of a transparent material in which the light may propagate while being internally reflected. The waveguide 130 may have the shape of a flat plate or a curved plate. Herein, the transparent material may refer to a material through which light in a visible light band passes. A transparency of the transparent material may be less than 100%, and the transparent material may have a certain color. The waveguide 130 may include a first region 131 facing the display engine 120 that receives light Li of a virtual image projected from the display engine 120, a second region 132 to which the light of the virtual image incident to the first region 131 propagates, and a third region 133 that outputs light Lo of the virtual image propagating from the second region 132.

The waveguide 130 may be mounted on the frame 111 of FIG. 1 such that the third region 133 is positioned in front of the pupils of the user when the user wears the AR display device 100. As the waveguide 130 is formed of a transparent material, the user may see the real scene as well as the virtual image through the AR display device 100, and thus the AR display device 100 may implement AR.

In an embodiment of the disclosure, in the first region 131 of the waveguide 130, an input diffraction grating may be formed to couple incident light. When the waveguide 130 is formed as a single layer, the input diffraction grating of the first region 131 may be formed on a surface facing the display engine 120. Alternatively, when the waveguide 130 is formed as multiple layers, the input diffraction grating of the first region 131 may be formed on each layer or some layers.

The display engine 120 may be arranged such that emitted light is incident perpendicularly or inclinedly at a certain angle with respect to the first region 131.

The second region 132 may be positioned in a first direction (for example, in FIG. 4, the direction indicated as X) with respect to the first region 131. The second region 132 may overlap with the entire first region 131 or a part thereof. The second region 132 may be formed on the entire area of the waveguide 130. In the second region 132, a diffraction grating may be provided such that incident light of a virtual image propagates to the third region 133. When the waveguide 130 is formed as a single layer, the diffraction grating of the second region 132 may be formed on the same surface as a surface where the diffraction grating of the first region 131 is formed or an opposite surface to the surface. When the waveguide 130 is formed as multiple layers, the diffraction grating of the second region 132 may be formed on the same surface as the surface where the diffraction grating of the first region 131 is formed, or on a different surface than the surface. Although it is described in the illustrated embodiment of the disclosure that the second region 132 is a single region, the second region 132 may be divided into a plurality of regions. When the waveguide 130 is formed as multiple layers, the second region 132 may include a plurality of regions formed on different layers.

The third region 133 may be positioned in a side of a surface facing eyes of the user when the user wears the AR display device 100. For example, in FIG. 4, the third region 133 may be positioned in a second direction with respect to the first region 131. The second direction may be the same as the first direction, as in the embodiment shown in FIG. 4, or it may be a different direction. The entire third region 133 or a part thereof may overlap with the second region 132. In the third region 133, an output grating array may be formed to output light propagating from the second region 132. When the waveguide 130 is formed as a single layer, the output grating array of the third region 133 may be formed on a surface of the waveguide 130, which faces the eyes of the user, or a back surface thereof. Alternatively, when the waveguide 130 is formed as multiple layers, the output grating array of the third region 133 may be formed on some or all of the multiple layers.

Figure 5:
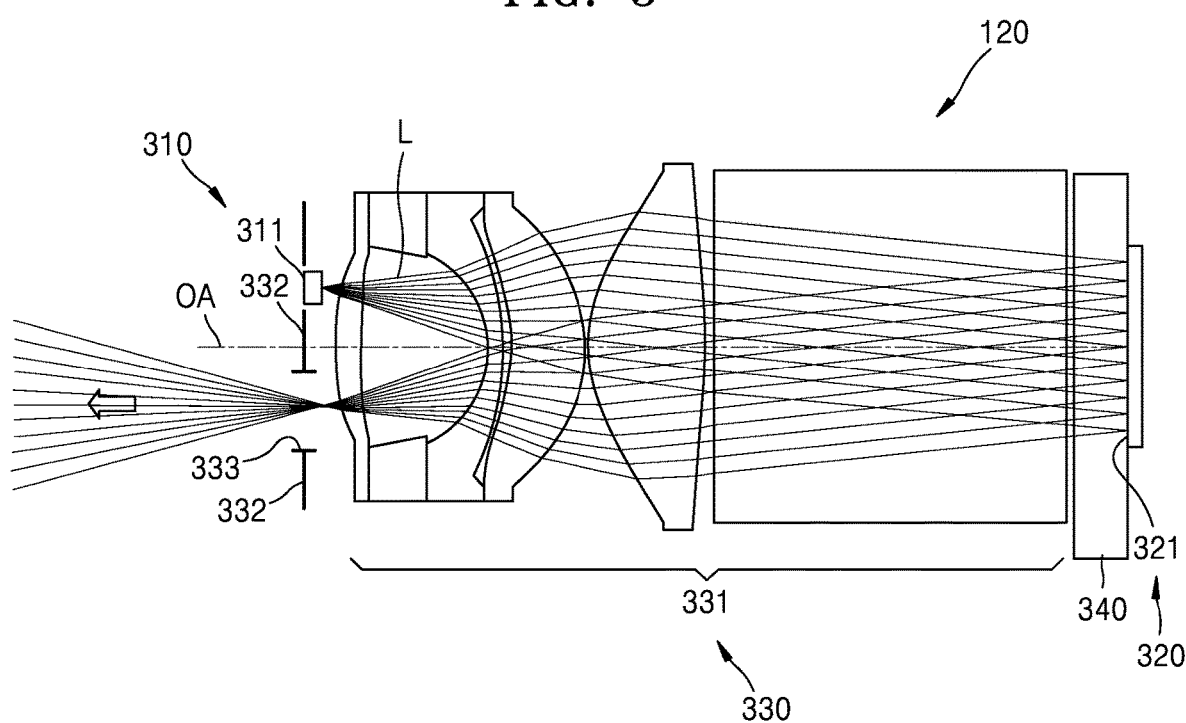
FIG. 5 illustrates an optical arrangement of a display engine, according to an example embodiment of the disclosure.
Figure 6:
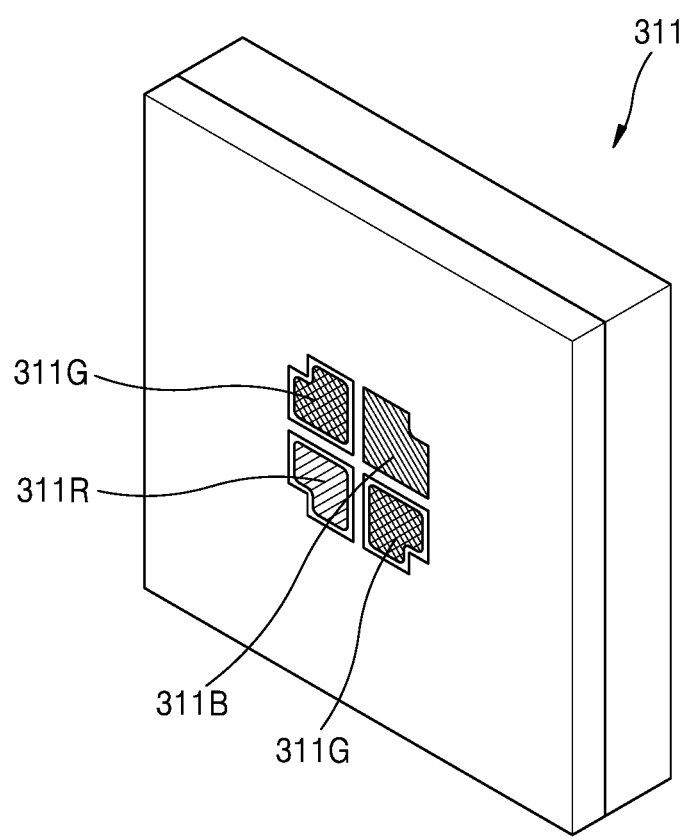
FIG. 6 illustrates a light source, according to an example embodiment of the disclosure.
Figure 7:
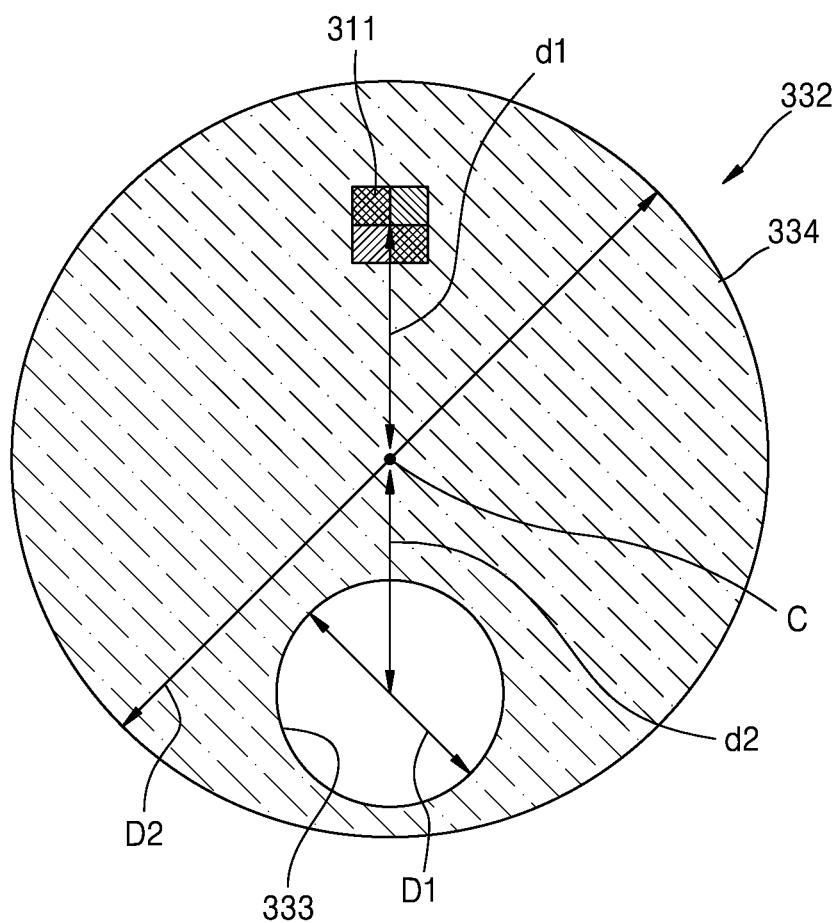
FIG. 7 illustrates an arrangement of a light source and an iris, according to an example embodiment of the disclosure.

FIG. 5 illustrates an optical arrangement of the display engine 120, FIG. 6 illustrates a light source 311, and FIG. 7 illustrates an arrangement of the light source 311 of a light source unit 310 and an iris 332, each according to an example embodiment of the disclosure.

Referring to FIGS. 5 to 7, the display engine 120 may include the light source unit 310, a display panel 320, and a projection optical system 330.

The light source unit 310 may include one light source 311 or a plurality of light sources 311. The light source 311 may be arranged near the iris 332 of the projection optical system 330.

The light source 311 may be, but not limited to, a light-emitting element such as a light-emitting diode (LED) or a laser diode (LD). For example, as shown in FIG. 6, the light source 311 may be an LED package on which light-emitting elements 311R, 311G, and 311B of RGB are mounted. The light-emitting elements 311R, 311G, and 311B of RGB may be arranged substantially adjacent to each other, such that they emit light from substantially the same position.

FIG. 6 illustrates an LED package on which one red LED chip 311R, two green LED chips 311G, and one blue LED chip 311B are mounted, but the arrangement and composition of the LED chips is not limited to the configuration shown in FIG. 6. In another example, the light-emitting elements 311R, 311G, and 311B of RGB may be provided one by one. In another example, a light-emitting element in white (W) may be further provided. In another example, two red light-emitting elements 311R may be provided, and one green LED chip 311G and one blue LED chip 311B may be provided. The light-emitting elements 311R, 311G, and 311B of RGB may be sequentially driven to sequentially illuminate red light, green light, and blue light. The light-emitting elements 311R, 311G, and 311B of RGB may be driven in any suitable order.

A lens, for example in the form of a dome, may be provided on a top surface of the LED package such that the light-emission distribution of light emitted from the LED package may be suitable for the optical design of the projection optical system 330 described below. Alternatively, a condensing lens or collimating lens may be arranged attached to or spaced apart from an exit surface of the LED package.

The display panel 320 may be a device that forms an image by using the light emitted from the light source unit 310, and include light modulation devices arranged two-dimensionally. The display panel 320 used in the illustrated embodiment of the disclosure may be a reflective display panel, e.g., a liquid crystal on silicon (LCoS) panel. In another example, the display panel 320 may be a digital micro-mirror device (DMD) panel or another known reflective panel, which is switchable from a state where micro mirrors are arranged selectively flat or tilted by an electrical signal.

In FIG. 5, cover glass 340 is arranged on a side of a panel surface 321 of the display panel 320. The display panel 320 may implement a color image by chronologically forming two-dimensional images of red, green, and blue and reflecting red light, green light, and blue light, in correspondence to the red light, the green light, and the blue light chronologically illuminated from the light source unit 310.

The projection optical system 330 may include a projection lens group 331 and the iris 332.

The projection lens group 331 may be an optical member that projects an image generated from the display panel 320 to the first region 131 of the waveguide 130, and may include one optical lens or a plurality of optical lenses. The projection lens group 331 may be arranged between the iris 332 and the display panel 320. In other words, the iris 332 may be arranged on a front surface of the projection lens group 331. The iris 332 may include an effective opening 333 that defines an effective diameter of the projection lens group 331. The effective opening 333 may be formed of a transparent material or the air (i.e., a hole). While FIG. 7 shows a case where the effective opening 333 is circular, the disclosure is not limited thereto. In another example, the effective opening 333 may have a polygonal shape. The iris 332 may further include an additional region 334 formed of an opaque material.

The light source 311 may be positioned on or in a side of the iris 332. The light source 311 may be arranged spaced apart from a center C of the iris 332 by a distance d1. The center C of the iris 332 may be an optical axis (OA of FIG. 5).

The light source 311 may be placed at substantially the same position as the iris 332, when viewed in a longitudinal direction of the optical axis OA. Alternatively, the light source 311 may be arranged slightly apart toward a front side of the iris 332 (i.e., a far side from the display panel 320) or a rear side of the iris 332 (i.e., a near side to the display panel 320), when viewed in the longitudinal direction of the optical axis OA.

In an embodiment of the disclosure, in a position where the light source 311 of the iris 332 is arranged, a groove, etc., may be provided to allow the light source 311 to be mounted therein.

In an embodiment of the disclosure, a side of the iris 332 may be cut and the light source 311 may be arranged in a cut position.

The effective opening 333 may be provided in a position opposing the light source 311 with respect to the center C (i.e., the optical axis OA). A center of the effective opening may be spaced apart from a center C of the iris 332 by a distance d2. Light L emitted from the light source 311 may be illuminated to the display panel 320 through the projection lens group 331. In this case, the projection lens group 331 may function as an illumination optical system for the light source 311. The projection lens group 331 may allow the light emitted from the light source 311 to uniformly illuminate the entire panel surface 321 (i.e., an effective modulation surface) of the display panel 320. Thereafter, the light of the 2D image reflected through modulation from the display panel 320 may pass through the projection lens group 331 and then through the effective opening 333 of the iris 332, thus being projected to the waveguide 130.

Figure 8:
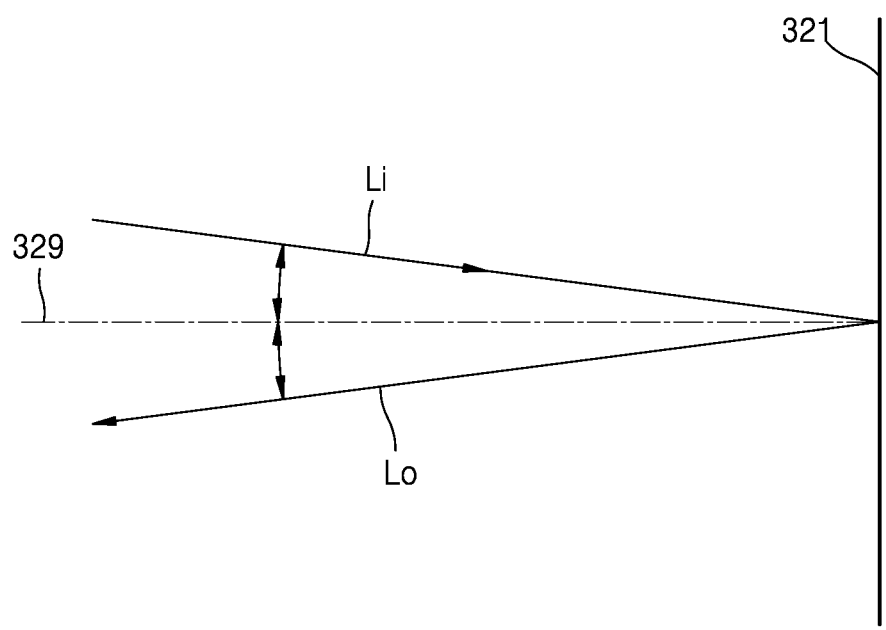
FIG. 8 illustrates an incident angle range and a reflection angle range in a display panel, according to an example embodiment of the disclosure.

FIG. 8 illustrates an incident angle range and a reflection angle range in the display panel 320, according to an example embodiment of the disclosure. Referring to FIG. 8, the incident light Li incident to the panel surface 321 may be positioned in a side with respect to a normal 329, and the reflected light Lo reflected from the panel surface 321 may be positioned in the other side with respect to the normal 329. As described above, the light source 311 is arranged spaced apart from the center C of the iris 332 (i.e., the optical axis OA), such that by appropriately selecting the distance d1 of the light source 311 from the center C, the angle range of the incident light Li may be prevented from overlapping with the angle range of the reflected light Lo, and thus the effective opening 333 of the iris 332 may be separated from the light source 311.

A diameter D1 of the effective opening 333 may be equal to or less than a half of a diameter D2 (i.e., a radius) of the iris 332. The diameter D1 of the effective opening 333 may differ according to an effective surface of the display panel 320 and an optical design of the projection lens group 331.

The display engine 120 according to the illustrated embodiment of the disclosure may be used for an AR display device such as a glasses-type device, and thus may be required to be very small in size. Thus, in the illustrated embodiment of the disclosure, by arranging the light source unit 310 near the iris 332, a member such as a prism arranged in front of a display panel in a conventional projection device may be removed, thereby reducing the size requirements of the display engine.

Although it is shown in FIG. 5 that the light emitted from the light source 311 is focused on the effective opening 333 of the iris 332, the disclosure is not limited thereto.

Figure 9:
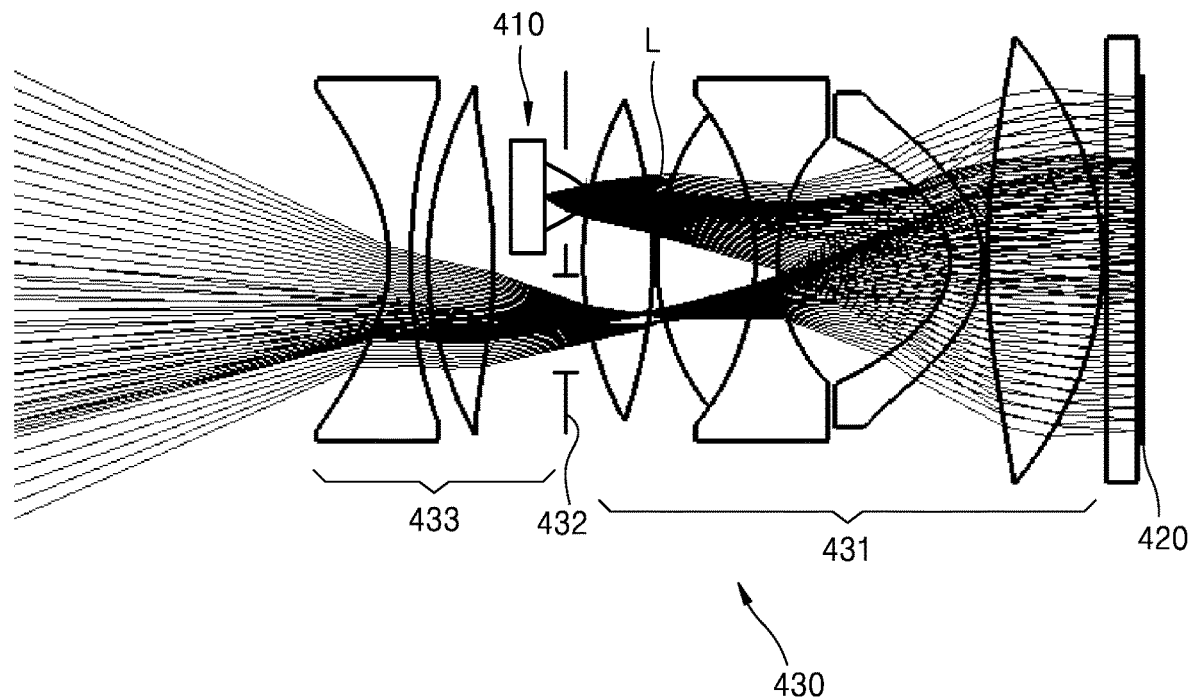
FIG. 9 illustrates an optical arrangement of a display engine, according to an example embodiment of the disclosure.

While it is described in the embodiment of the disclosure described with reference to FIGS. 5 to 8 that the projection lens group 331 is arranged between the iris 332 and the display panel 320, the disclosure is not limited thereto. FIG. 9 illustrates an optical arrangement of a display engine, according to an example embodiment of the disclosure. Referring to FIG. 9, the display engine may include a light source unit 410, a display panel 420, and a projection optical system 430. The illustrated embodiment of the disclosure is substantially the same as the display engine of the embodiment of the disclosure described with reference to FIGS. 5 to 8, except that the projection optical system 430 further includes a second projection lens group 433 as well as a first projection lens group 431 and an iris 432. The second projection lens group 433 may be arranged in front of the iris 432 (i.e., a far side from the display panel 420) and project light passing through an effective opening of the iris 432 toward the first region 131 of the waveguide 130 of FIG. 4.

While an example where the light source unit 310 is structured such that one LED package having LED chips of RGB mounted thereon is arranged in a side of the iris 332 is described in the embodiment of the disclosure with reference to FIGS. 5 to 8, the disclosure is not limited thereto. Next, various alternate arrangements of one or more light sources and an iris will be described.

Figure 10:
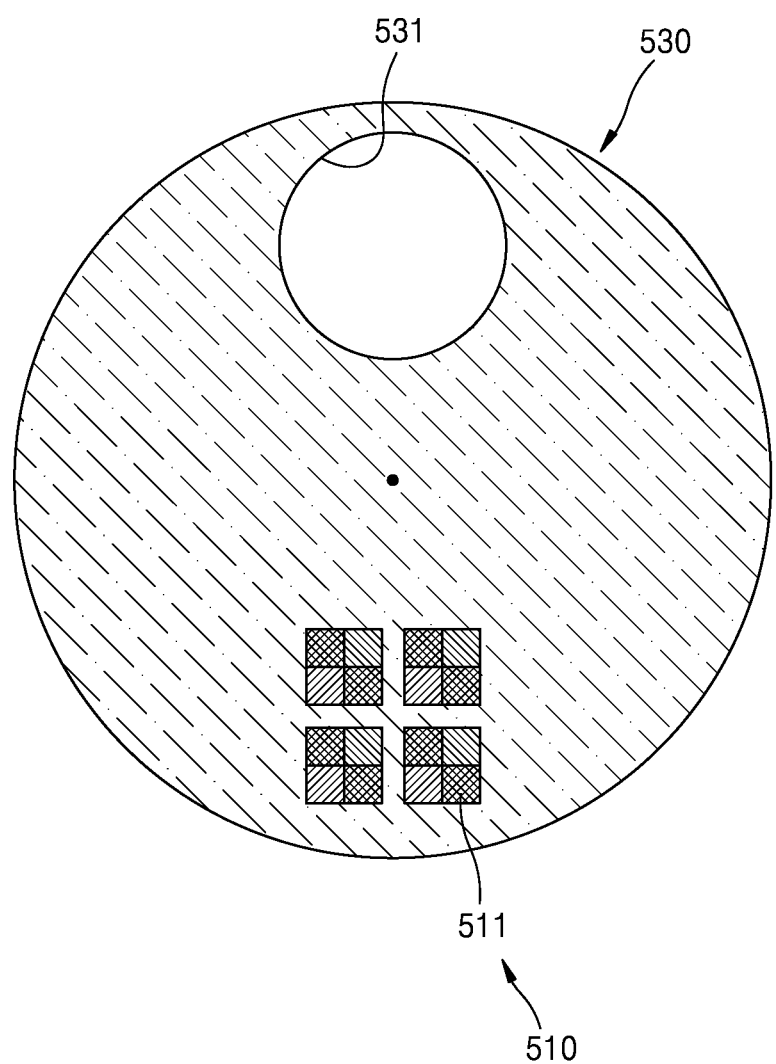
FIGS. 10-16 illustrate various alternate arrangements of one or more light sources and an iris, according to example embodiments of the disclosure.

FIG. 10 illustrates another arrangement of a light source unit 510 and an iris 530, according to an example embodiment of the disclosure. Referring to FIG. 10, the light source unit 510 may include four light sources 511 arranged substantially adjacent to each other, such that the four light sources 511 emit light from substantially the same position. The number of light sources 511 shown in FIG. 10 is an example, and does not limit the scope of the disclosure. Each of the light sources 511 may be an LED package having LED chips of RGB mounted thereon. The plurality of light sources 511 are arranged in substantially the same position, such that one effective opening 531 corresponding thereto may be provided in the iris 530.

Figure 11:
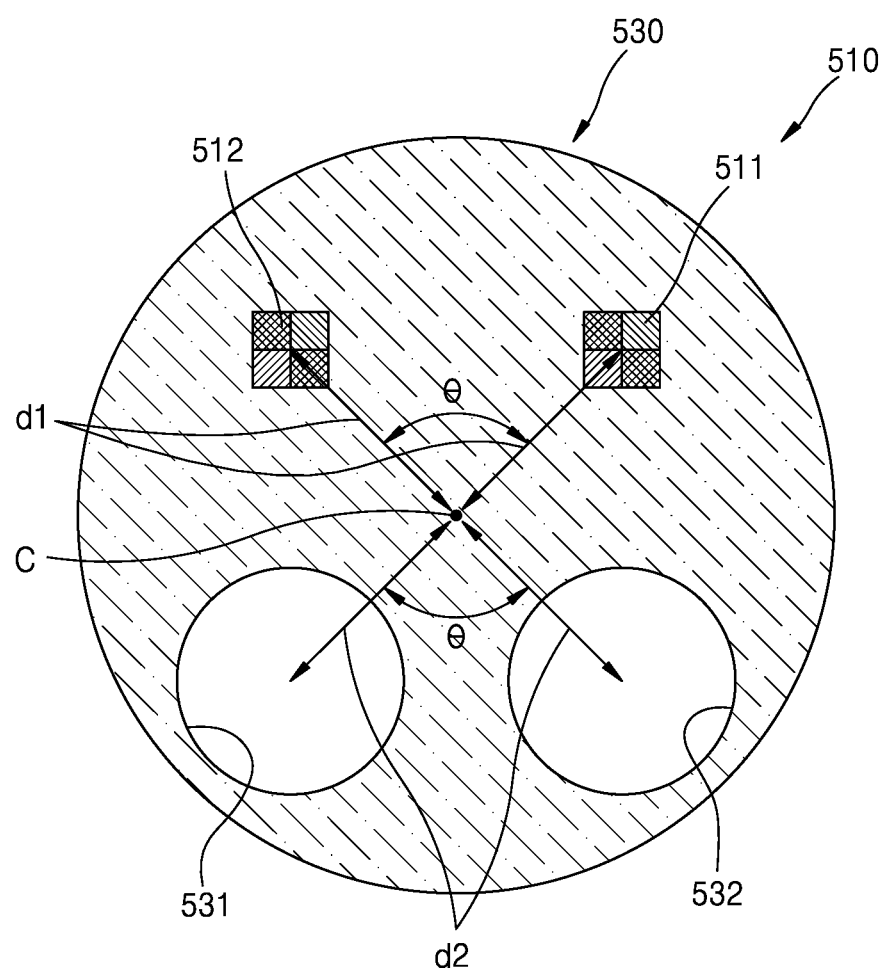

FIG. 11 illustrates another arrangement of the light source unit 510 and the iris 530, according to an example embodiment of the disclosure. Referring to FIG. 11, the light source unit 510 may include two light sources 511 and 512 arranged in two positions spaced apart from each other. Each of the light sources 511 and 512 may be an LED package having LED chips of RGB mounted thereon. The two light sources 511 and 512 are arranged in positions spaced apart from each other, such that two effective openings 531 and 532 corresponding thereto may be provided in the iris 530. A distance d1 between the light sources 511 and 512 and the center C of the iris 530 and a distance d2 between centers of the effective openings 531 and 532 and the center C of the iris 530 may be substantially equal to each other. When a diameter of the two effective openings 531 and 532 is considered, an angle θ between the two light sources 511 and 512 with respect to the center C of the iris 530 may be limited and may be less than about 100 degrees. As shown in FIG. 11, the angle θ between the two light sources 511 and 512 may be about 90 degrees. An angle between the two effective openings 531 and 532 may be substantially equal to the angle θ between the two light sources 511 and 512.

Figure 12:
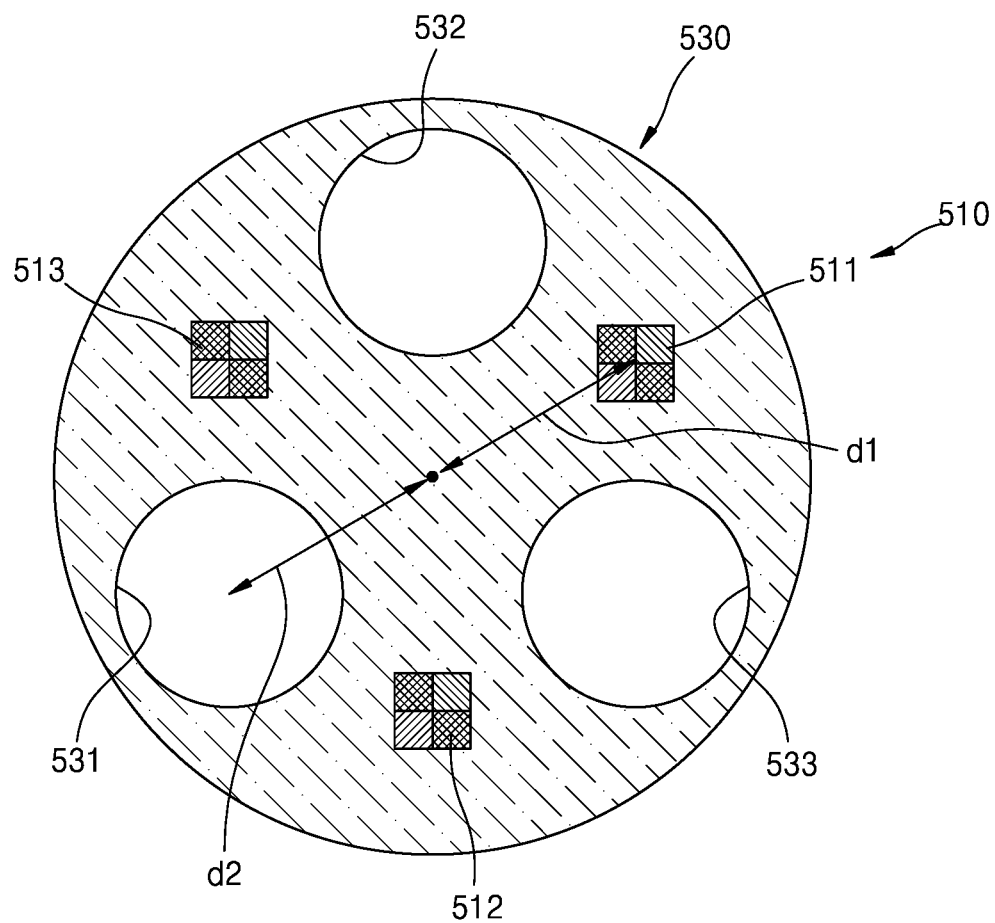

FIG. 12 illustrates another arrangement of the light source unit 510 and the iris 530 according to an example embodiment of the disclosure. Referring to FIG. 12, the light source unit 510 may include three light sources 511, 512, and 513 arranged in three positions spaced apart from one another at substantially regular angular spacing with respect to the center C of the iris 530. That is, the three light sources 511, 512, and 513 may be arranged spaced apart from each other at an interval of substantially 120 degrees—one third of a circle defined with respect to the center C of the iris 530. Each of the light sources 511, 512, and 513 may be an LED package having LED chips of RGB mounted thereon. The three light sources 511, 512, and 513 are arranged in positions spaced apart from each other, such that three effective openings 531, 532, and 533 corresponding thereto may be provided in the iris 530. The distance d1 between the light sources 511, 512, and 513 and the center C of the iris 530 and the distance d2 between the effective openings 531, 532, and 533 and the center C of the iris 530 may be substantially equal to each other. As can be seen in FIG. 12, such arrangement may alternatingly intersperse the effective openings 531, 532, and 533 among the light sources 511, 512, and 513.

Figure 13:
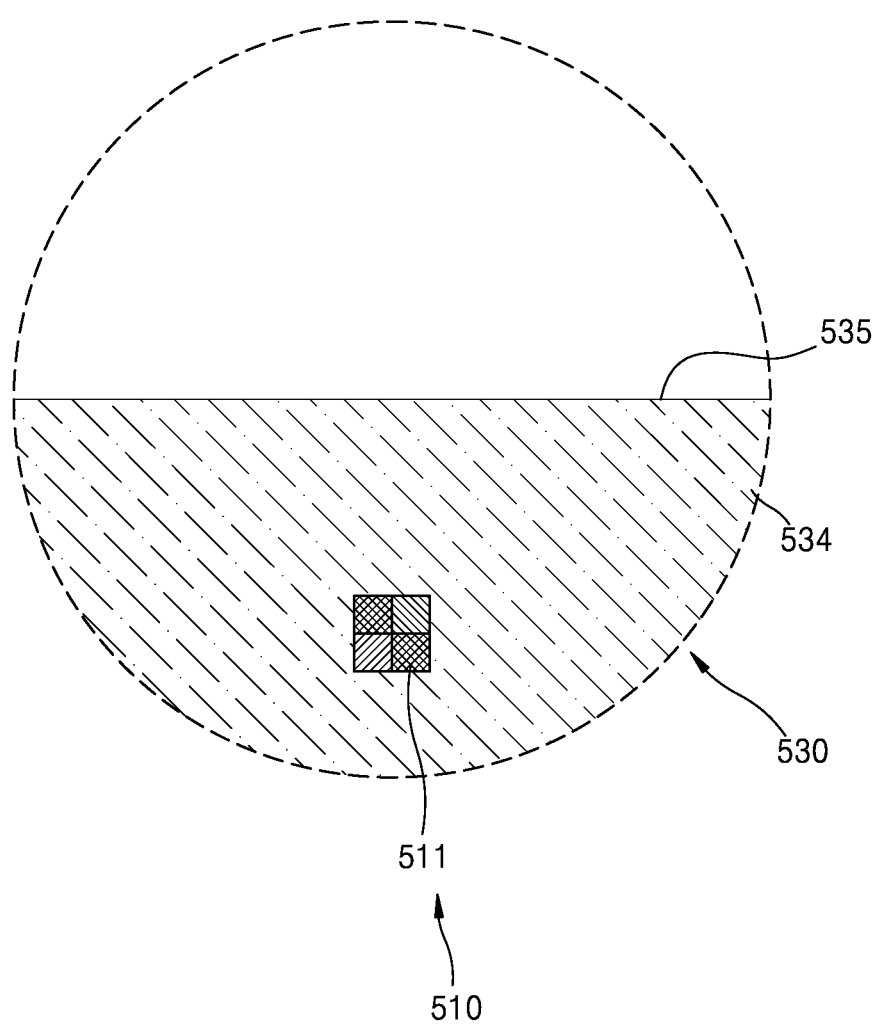

FIG. 13 illustrates another arrangement of the light source unit 510 and the iris 530, according to an example embodiment of the disclosure. Referring to FIG. 13, a side 534 of the iris 530 where one light source 511 is arranged may be formed of an opaque material, and a half portion 535 may be removed in place of an effective opening. One light source 511 may be an LED package having LED chips of RGB mounted thereon. In the illustrated embodiment of the disclosure, the half portion 535 in which the opaque material of the iris 530 is removed may be understood as an effective opening.

Figure 14:
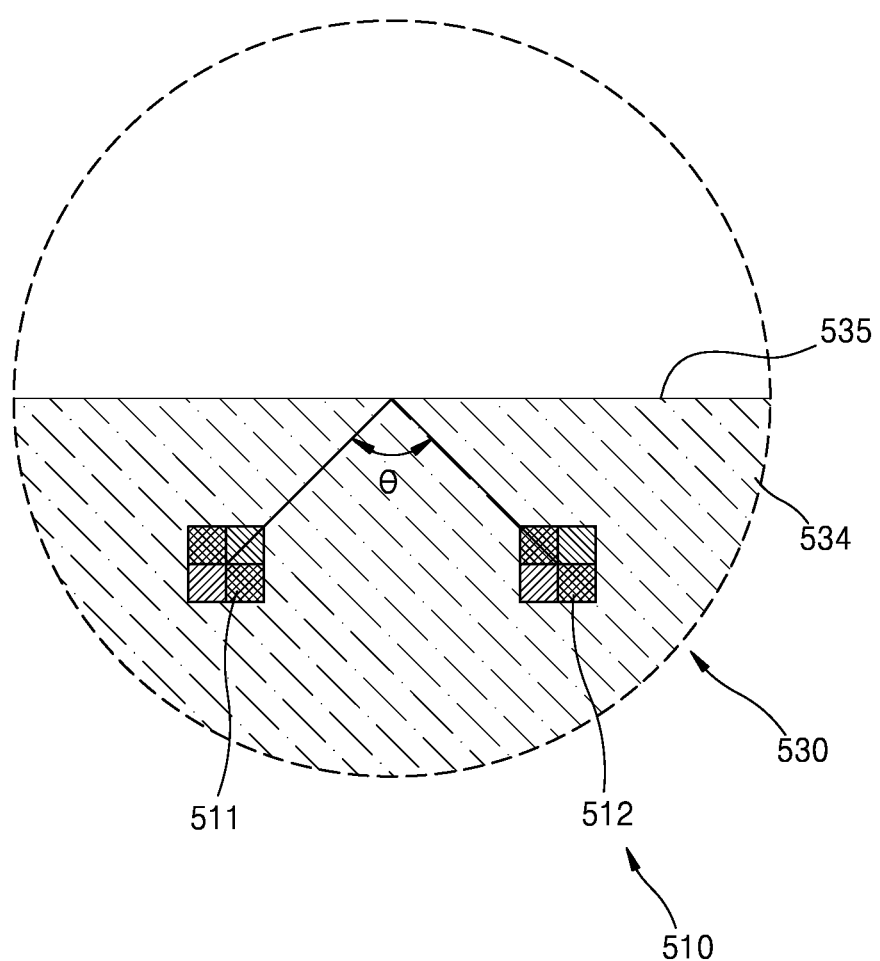

FIG. 14 illustrates another arrangement of the light source unit 510 and the iris 530, according to an example embodiment of the disclosure. The illustrated embodiment of the disclosure is substantially the same as the embodiment of the disclosure described with reference to FIG. 13, except that the light source unit 510 includes the two light sources 511 and 512. Like in FIG. 13, a side of the iris 530 where the two light sources 511 and 512 are arranged may be formed of an opaque material, and a half portion 535 may be removed in place of an effective opening. The angle θ between the light sources 511 and 512 with respect to the center C of the iris 530 may be less than about 100 degrees, for example, substantially 90 degrees.

Figure 15:
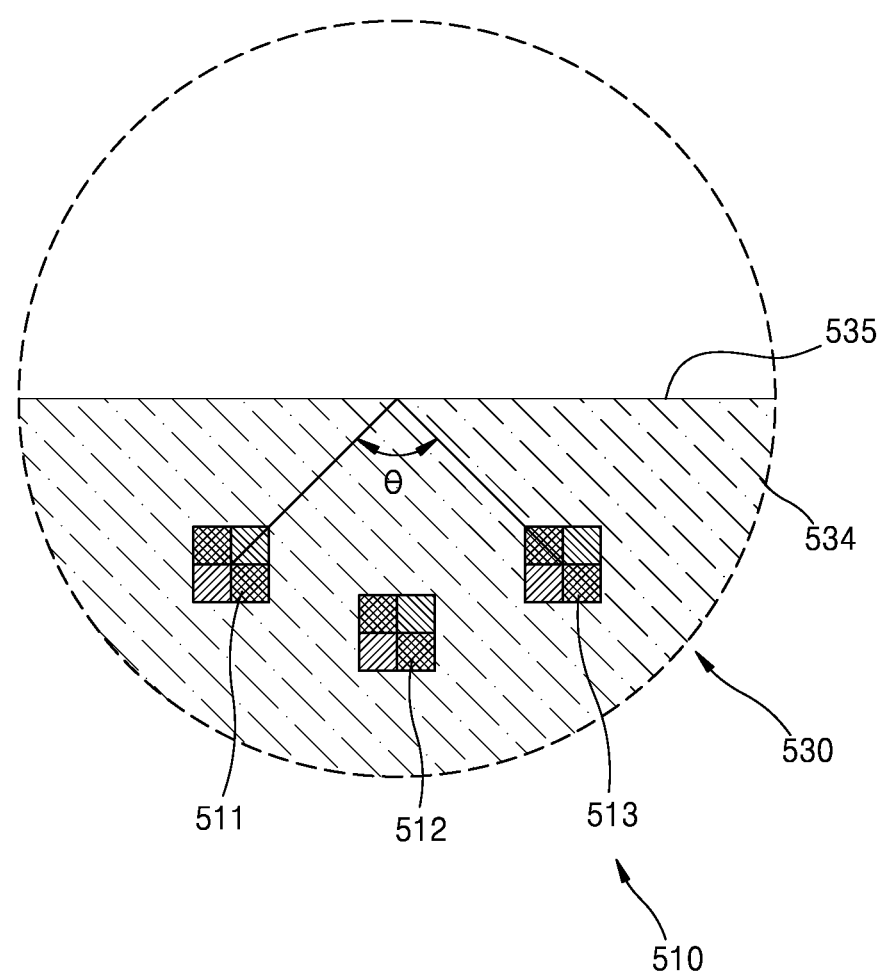

FIG. 15 illustrates another arrangement of the light source unit 510 and the iris 530, according to an example embodiment of the disclosure. The illustrated embodiment of the disclosure is substantially the same as the embodiments of the disclosure described with reference to FIGS. 13 and 14, except that the light source unit 510 includes the three light sources 511, 512, and 513. Like in FIGS. 13 and 14, a side of the iris 530 where the light sources 511, 512, and 513 are arranged may be formed of an opaque material, and the half portion 535 may be removed in place of an effective opening. The angle θ between the light sources 511 and 513 with respect to the center C of the iris 530 may be less than about 100 degrees, for example, substantially 90 degrees. The light sources 511, 512, and 513 may be arranged at substantially regular angular spacing with respect to each other; for example, if the angle θ between the light sources 511 and 513 is substantially 90 degrees, the light source 512 between them may be arranged at substantially 45 degrees to each.

Figure 16:
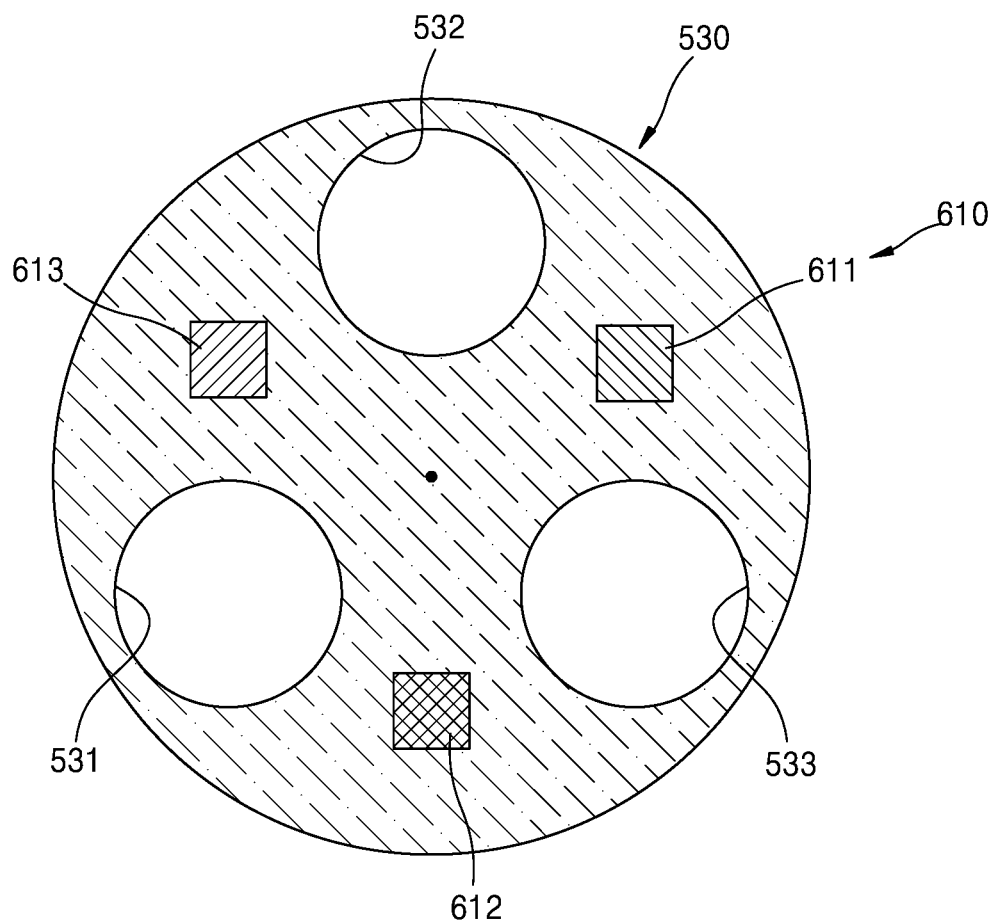

Although an example where light sources of the light source unit 510 include light-emitting elements of RGB is described in the above-described embodiments of the disclosure, the disclosure is not limited thereto. FIG. 16 illustrates arrangement of a light source unit 610 and the iris 530 according to an embodiment of the disclosure. The illustrated embodiment of the disclosure is substantially the same as the embodiment of the disclosure described with reference to FIG. 12, except that the light source unit 610 includes different monochromatic light sources 611, 612, and 613. The different monochromatic light sources 611, 612, and 613 may be, for example, a red LED chip, a green LED chip, and a blue LED chip. The iris 530 may include the three effective openings 531, 532, and 533 corresponding to the three light sources 611, 612, and 613, like in FIG. 12.

Figure 17:
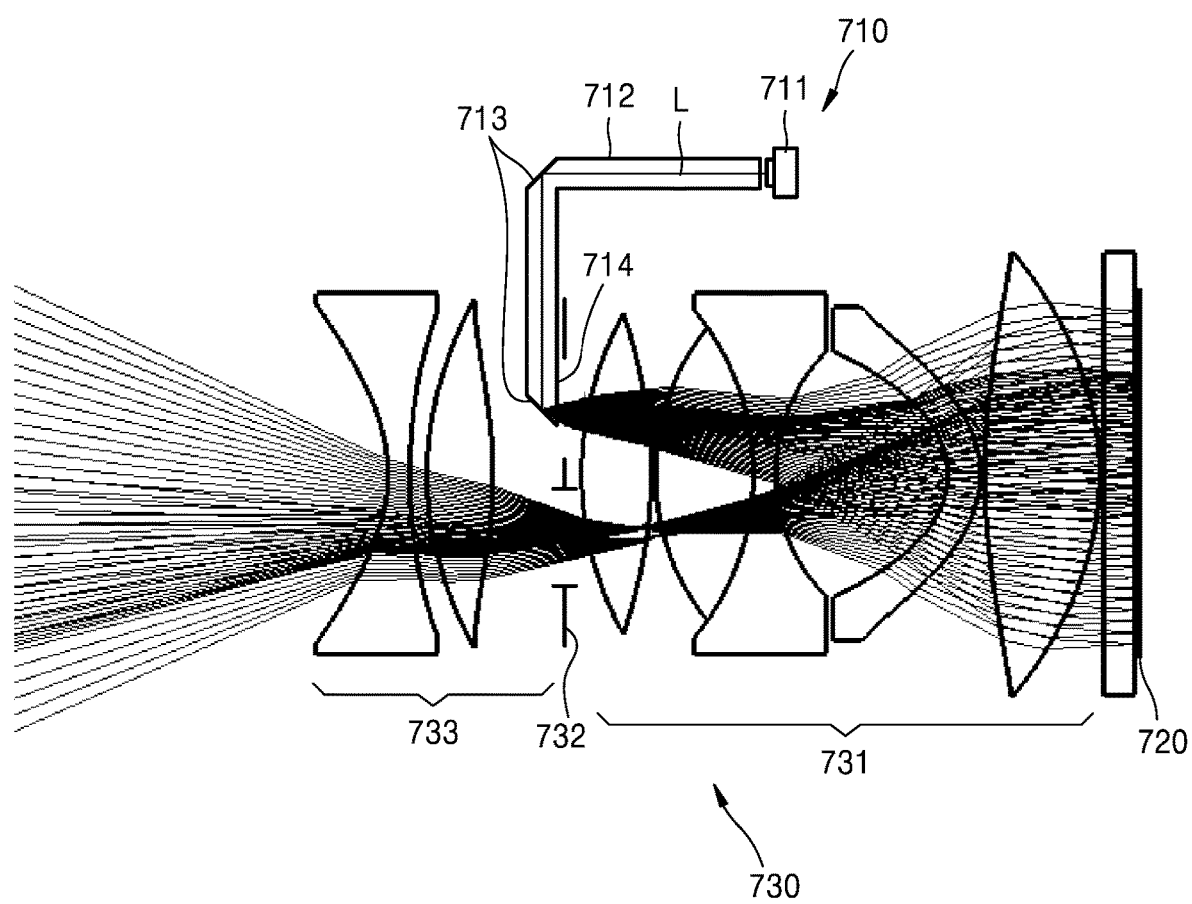
FIGS. 17 and 18 illustrate various alternate optical arrangements of a display engine, according to example embodiments of the disclosure.

Although an example where a light source of a light source unit is arranged directly in an iris is described in the above-described embodiments of the disclosure, the disclosure is not limited thereto. FIG. 17 illustrates another optical arrangement of a display engine, according to an example embodiment of the disclosure. Referring to FIG. 17, the display engine may include a light source unit 710, a display panel 720, and a projection optical system 730. The projection optical system 730 may include an iris 732, a first projection lens group 731 arranged between the iris 732 and the display panel 720, and a second projection lens group 733 arranged in front of the iris 732 (i.e., a far side from the display panel 720). In the illustrated embodiment of the disclosure, a light source 711 of the light source unit 710 may be arranged outside a projection optical system 730, and light may be emitted toward the iris 732 of the projection optical system 730 through a separate light guide 712. That is, the display engine according to the illustrated embodiment of the disclosure may be substantially the same as the display engine according to the above-described embodiments of the disclosure, except that a light exit end 714 of the light guide 712 is arranged near the iris 732. The light guide 712 may be formed of a transparent material, and may transmit light emitted from the light source 711 through internal total reflection and allow light to be emitted to the light exit end 714 located at an end thereof. One or more mirrors 713 may be provided to change an optical path in the light guide 712. An optical fiber may be used instead of the light guide 712.

Figure 18:
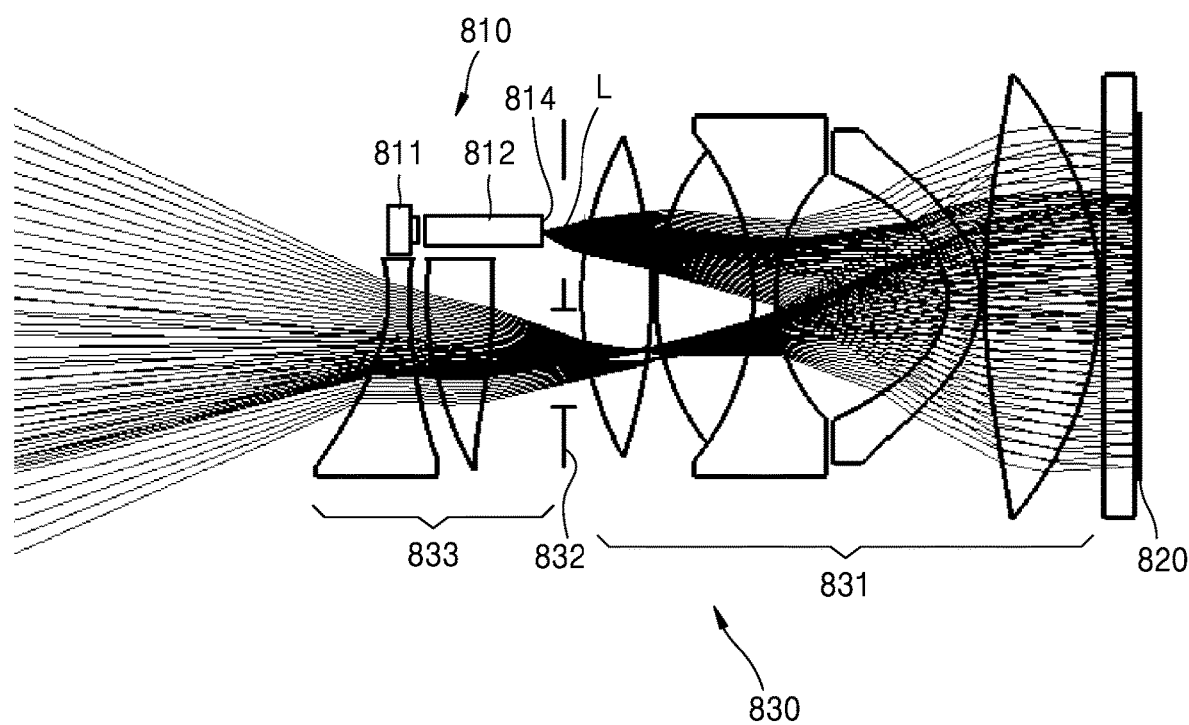

FIG. 18 illustrates another optical arrangement of a display engine, according to an example embodiment of the disclosure. Referring to FIG. 18, the display engine may include a light source unit 810, a display panel 820, and a projection optical system 830. In the illustrated embodiment of the disclosure, a light source 811 of the light source unit 810 may be arranged inside a projection optical system 830, and light may be emitted toward an iris 832 through a separate light pipe 812. That is, the display engine according to the illustrated embodiment of the disclosure may be substantially the same as the display engine according to the above-described embodiments of the disclosure, except that a light exit end 814 of the light pipe 812 is arranged near the iris 832. The light pipe 812 may be formed of a transparent material, and may transmit light emitted from the light source 811 through internal total reflection and allow light to be emitted to the light exit end 814 located at an end thereof. While FIG. 18 shows an example where a cross-sectional size of the light pipe 812 is uniform in an optical-axis direction, the disclosure is not limited thereto. The cross-sectional size of the light pipe 812 may gradually increase in the optical-axis direction to adjust the light-emission distribution of light.

The projection optical system 830 may include the iris 832, a first projection lens group 831 arranged between the iris 832 and the display panel 820, and a second projection lens group 833 arranged in front of the iris 832 (i.e., a far side from the display panel 820). As the light source unit 810 includes the light source 811 and the light pipe 812, a physical size of the light source unit 810 may increase, such that a part of the second projection lens group 833 may be removed to secure an installation space of the light source unit 810. Like in the embodiment of the disclosure described with reference to FIG. 5, there may be no second projection lens group.

In another embodiment of the disclosure, an illuminating optical system lens may be arranged in place of the light pipe 812. For example, the illuminating optical system lens may be a condensing lens or a collimating lens.

Figure 19:
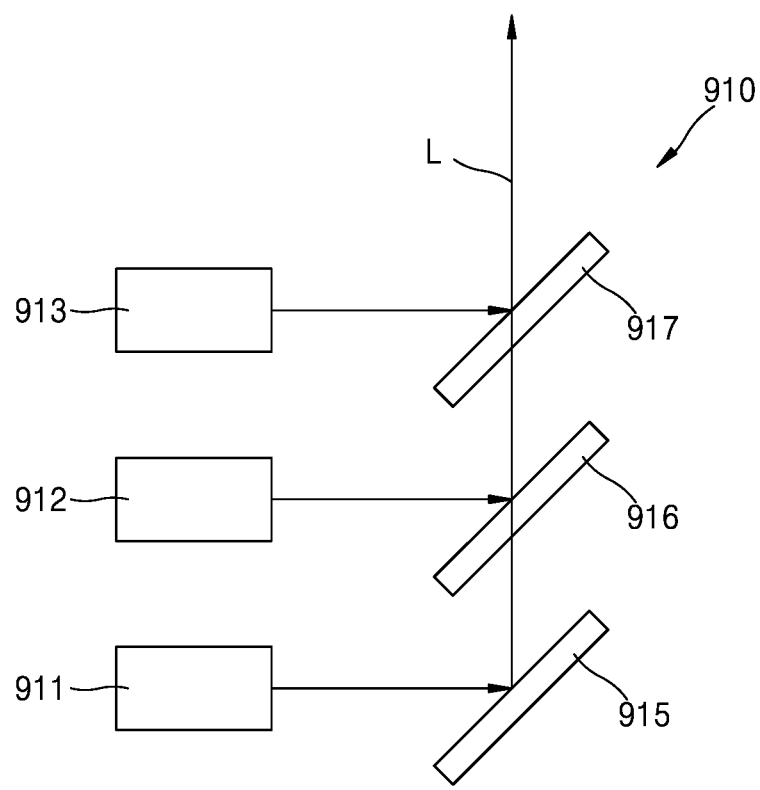
FIG. 19 illustrates a light source unit, according to an example embodiment of the disclosure.

FIG. 19 illustrates a light source unit, according to an example embodiment of the disclosure. Referring to FIG. 19, a light source unit 910 may include different monochromatic first through third light sources 911, 912, and 913 coupled by a first dichroic mirror 916 and a second dichroic mirror 917. The first through third light sources 911, 912, and 913 may be, for example, a red light source, a green light source, and a blue light source, respectively. The first dichroic mirror 916 may pass red light emitted from the first light source 911 and reflected off a mirror 915, and reflect the green light emitted from the second light source 912. Likewise, the second dichroic mirror 917 may pass the red light and the green light emitted from the first light source 911 and the second light source 912 and reflect the blue light emitted from the third light source 913. Although not shown in the drawings, condensing lenses may be arranged on an optical path of the light source unit 910. When the first to third light sources 911, 912, and 913 are LDs, an optical member or a device for reducing a speckle due to coherency of laser may be additionally arranged.

Figure 20:
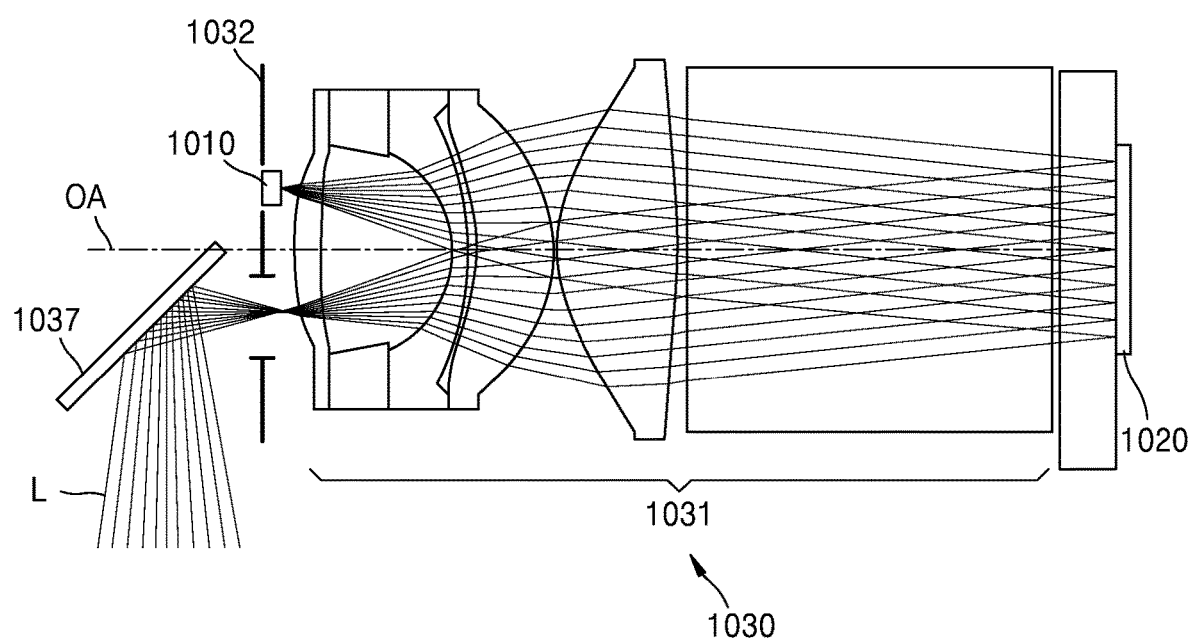
FIG. 20 illustrates an additional optical arrangement of a display engine, according to an example embodiment of the disclosure.

FIG. 20 illustrates another optical arrangement of a display engine, according to an example embodiment of the disclosure. Referring to FIG. 20, the display engine may include a light source unit 1010, a display panel 1020, and a projection optical system 1030. The projection optical system 1030 may include a projection lens group 1031 and an iris 1032. A reflection member 1037 may be arranged in front of the iris 1032 to change a path of the projected light L away from the optical axis OA. The illustrated embodiment of the disclosure may be substantially the same as the display engine of the above-described embodiments of the disclosure, except that a reflection member 1037 for changing the path of the projected light L is further provided in the projection optical system 1030. For example, when the AR display device is AR glasses, the size of the display engine may be limited, such that by arranging the reflection member 1037 at a front end of the projection optical system 1030, more freedom may be given to designing of the exterior of the AR glasses.

While the AR display device according to the disclosure has been shown and described in connection with the embodiments of the disclosure to help understanding of the disclosure, it will be apparent to those of ordinary skill in the art that modifications and variations may be made. Therefore, the true technical scope of the disclosure should be defined by the appended claims.

What is claimed is:

1. An augmented reality (AR) display device comprising:
   a display engine configured to project light of an image;
   a waveguide configured to receive and output light projected from the display engine; and
   a body on which the display engine and the waveguide are installed,
   wherein the display engine comprises a light source unit, a reflective display panel, and a projection optical system,
   the projection optical system comprises an iris and a first projection lens group arranged between the iris and the reflective display panel,
   the light source unit comprises at least one of a light source and a light exit end, positioned near the iris in a position deviating from an optical axis of the projection optical system such that an incident angle range of light incident to the reflective display panel does not overlap with a reflection angle range of light reflected from the reflective display panel, and
   the iris comprises an effective opening through which light reflected from the reflective display panel passes.

2. The AR display device of claim 1, wherein the light source unit comprises a plurality of light-emitting elements of different monochromatic colors, and the plurality of light-emitting elements are arranged substantially adjacent to each other.

3. The AR display device of claim 1, wherein the light source unit comprises a plurality of light-emitting elements arranged respectively at a plurality of positions spaced apart from one another.

4. The AR display device of claim 3, wherein the plurality of light-emitting elements arranged spaced apart from one another are light-emitting elements of different monochromatic colors.

5. The AR display device of claim 3, wherein the plurality of light-emitting elements arranged spaced apart from one another are light-emitting elements of the same monochromatic color.

6. The AR display device of claim 3, wherein the plurality of light-emitting elements are arranged at substantially regular spacing with respect to the optical axis of the projection optical system.

7. The AR display device of claim 3, wherein the effective opening comprises a plurality of effective openings interspersed among the plurality of light-emitting elements.

8. The AR display device of claim 3, wherein the effective opening comprises a plurality of effective openings corresponding to the plurality of light-emitting elements arranged spaced apart from one another.

9. The AR display device of claim 1, wherein a distance between a center of the effective opening and a center of the iris is equal to a distance between the light source or the light exit end and the center of the iris.

10. The AR display device of claim 1, wherein the light source unit comprises the light source and a light guide configured to guide light emitted from the light source, and the light exit end is an exit end of the light guide.

11. The AR display device of claim 1, wherein the light source unit comprises the light source and a light pipe configured to transmit light emitted from the light source, and the light exit end is an exit end of the light pipe.

12. The AR display device of claim 1, wherein the first projection lens group is configured to function as an illuminating optical system configured to uniformly illuminate the reflective display panel with the light emitted from the light source unit.

13. The AR display device of claim 1, wherein the projection optical system further comprises a second projection lens group arranged at a front end of the iris.

14. The AR display device of claim 1, wherein the projection optical system further comprises a reflection member arranged at a front end of the iris to change a path of the light projected from the display engine.

15. The AR display device of claim 1, wherein the body is configured to be wearable by a user.

16. The AR display device of claim 1, wherein the light source or the light exit end is positioned on or in a side of the iris perpendicular to the optical axis of the projection optical system.

17. The AR display device of claim 1, wherein the light source unit, the reflective display panel, and the projection optical system are arranged such that:
   light from the light source unit is incident to the reflective display panel via the first projection lens group, and
   light from the reflective display panel is output toward the waveguide via the first projection lens group.

* * * * *